(12) United States Patent
Dodd et al.

(10) Patent No.: US 8,322,737 B2
(45) Date of Patent: Dec. 4, 2012

(54) SUSPENSION SYSTEM WITH INTEGRATED BRAKE MOUNTING AND SUSPENSION ARM

(75) Inventors: Cully B. Dodd, McKinney, TX (US); Todd Greaves, Anna, TX (US)

(73) Assignee: Watson & Chalin Manufacturing, Inc., McKinney, TX (US)

(*) Notice: Subject to any disclaimer, the term of this patent is extended or adjusted under 35 U.S.C. 154(b) by 333 days.

(21) Appl. No.: 12/603,115

(22) Filed: Oct. 21, 2009

(65) Prior Publication Data

US 2011/0089660 A1     Apr. 21, 2011

(51) Int. Cl.
*B60G 3/12*     (2006.01)

(52) U.S. Cl. ........... 280/124.128; 280/124.116; 188/206

(58) Field of Classification Search ........... 280/124.116, 280/124.128; 188/206
See application file for complete search history.

(56) References Cited

U.S. PATENT DOCUMENTS

| | | | |
|---|---|---|---|
| 4,445,597 A * | 5/1984 | Baltare | 188/206 A |
| 5,301,774 A * | 4/1994 | Cho et al. | 188/206 A |
| 5,624,011 A | 4/1997 | White et al. | |
| 5,695,025 A | 12/1997 | White | |
| 5,921,341 A * | 7/1999 | Atkins | 180/350 |
| 6,279,695 B1 | 8/2001 | Davison | |
| 6,446,748 B1 * | 9/2002 | Suzuki | 180/350 |
| 6,581,715 B2 * | 6/2003 | Montague | 180/350 |
| 7,178,816 B2 * | 2/2007 | Chan et al. | 280/124.116 |
| 7,360,774 B2 * | 4/2008 | Saieg et al. | 280/124.128 |
| 7,607,670 B2 * | 10/2009 | Raidel et al. | 280/124.11 |
| 7,726,673 B2 * | 6/2010 | Saieg et al. | 280/124.128 |
| 7,775,535 B2 * | 8/2010 | Bluff et al. | 280/124.116 |
| 7,854,438 B2 * | 12/2010 | Richardson | 280/124.116 |
| 2006/0225974 A1 | 10/2006 | Inada et al. | |
| 2007/0051570 A1 | 3/2007 | Hendrickson | |

* cited by examiner

*Primary Examiner* — Toan To
(74) *Attorney, Agent, or Firm* — Smith IP Services, P.C.

(57) ABSTRACT

A method of constructing a vehicle suspension system includes forming a suspension arm having a pivot connection at an end thereof, and a brake mounting integrally formed with the suspension arm; and then securing the suspension arm to an axle. A suspension system includes an axle and a suspension arm having a pivot connection which pivotably connects the axle to a vehicle frame, whereby the axle is vertically displaceable relative to the frame. At least one brake shoe is pivotably mounted to the suspension arm. Another suspension system includes a suspension arm having a pivot connection at an end thereof, and a brake spider integrally formed with the suspension arm. The brake spider includes at least one opening which receives a brake shoe pivot therein.

28 Claims, 7 Drawing Sheets

SUSPENSION SYSTEM WITH INTEGRATED BRAKE MOUNTING AND SUSPENSION ARM

BACKGROUND

This disclosure relates generally to vehicle suspension systems and, in an example described below, more particularly provides a suspension system with an integrated brake mounting and suspension arm.

It is common practice in the suspension system art to separately attach a suspension arm and a brake mounting to an axle. The brake mounting could be a brake spider for mounting brake shoes, or a disc brake caliper mounting, etc. Typically, the suspension arm and the brake mounting are welded to the axle in separate operations.

The present inventors have devised a way of reducing the number of components in a suspension system, thereby reducing weight, inventory and time to manufacture the suspension system. This reduces or eliminates many of the drawbacks of prior suspension systems.

SUMMARY

In the disclosure below, suspension systems and associated methods are provided which bring improvements to the art. One example is described below in which a suspension arm is provided with brake mounting elements (such as a brake spider, brake shoe pivots, etc.). Another example is described below in which a brake spider is integrally formed with a suspension arm.

In one aspect, a method of constructing a vehicle suspension system is provided to the art. The method includes forming a suspension arm having a pivot connection at an end thereof, and a brake mounting integrally formed with the suspension arm. The suspension arm is then secured to an axle. The brake mounting may comprise a brake spider, an opening for a brake shoe pivot, a disc brake caliper mounting, etc.

In another aspect, a suspension system is provided which includes an axle and a suspension arm having a pivot connection which pivotably connects the axle to a vehicle frame, whereby the axle is vertically displaceable relative to the frame. At least one brake shoe is pivotably mounted to the suspension arm.

In yet another aspect, a suspension system is provided which includes a suspension arm having a pivot connection at an end thereof, and a brake spider integrally formed with the suspension arm. The brake spider includes at least one opening which receives a brake shoe pivot therein.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

Figure 1:
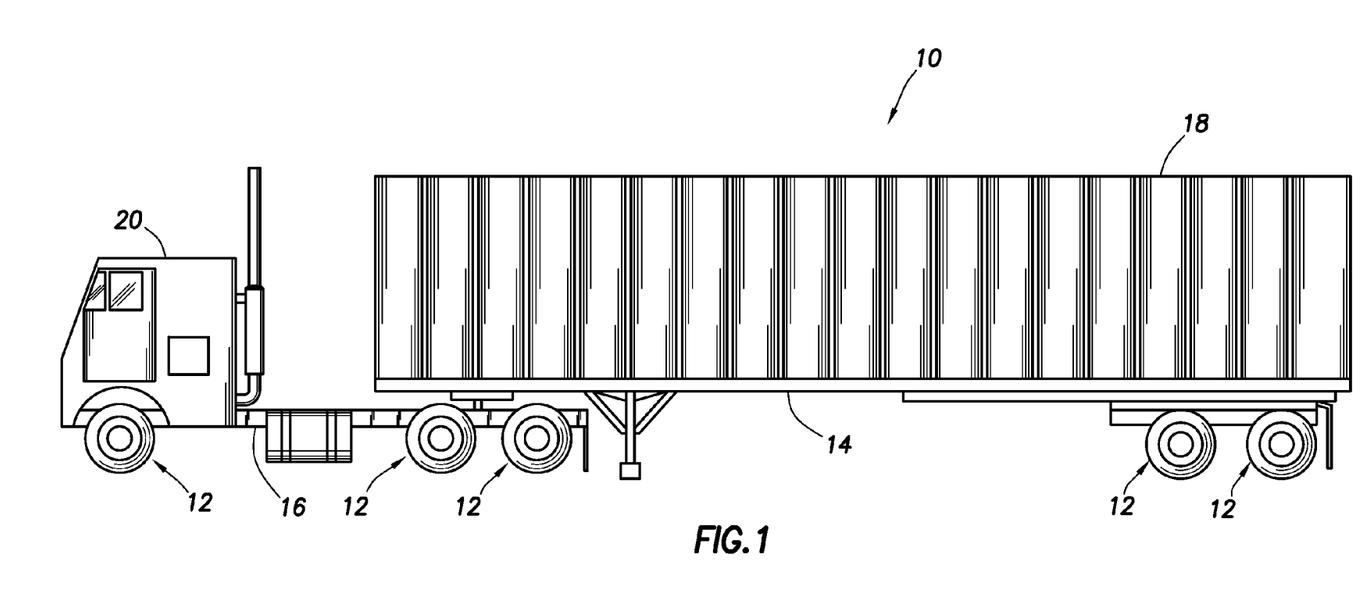
FIG. 1 is a side elevational view of a vehicle including suspension systems which can embody principles of the present disclosure.

Representatively illustrated in FIG. 1 is a vehicle 10 which can embody principles of this disclosure. The vehicle 10 comprises a tractor/trailer rig in this example, but other types of vehicles (whether or not self-propelled) can also benefit from the principles described herein.

The vehicle 10 includes several suspension systems 12 which incorporate features provided by this disclosure. The suspension systems 12 function to suspend a frame 14 of a trailer 18, and/or a frame 16 of a tractor or truck 20, above a road surface.

Figure 2:
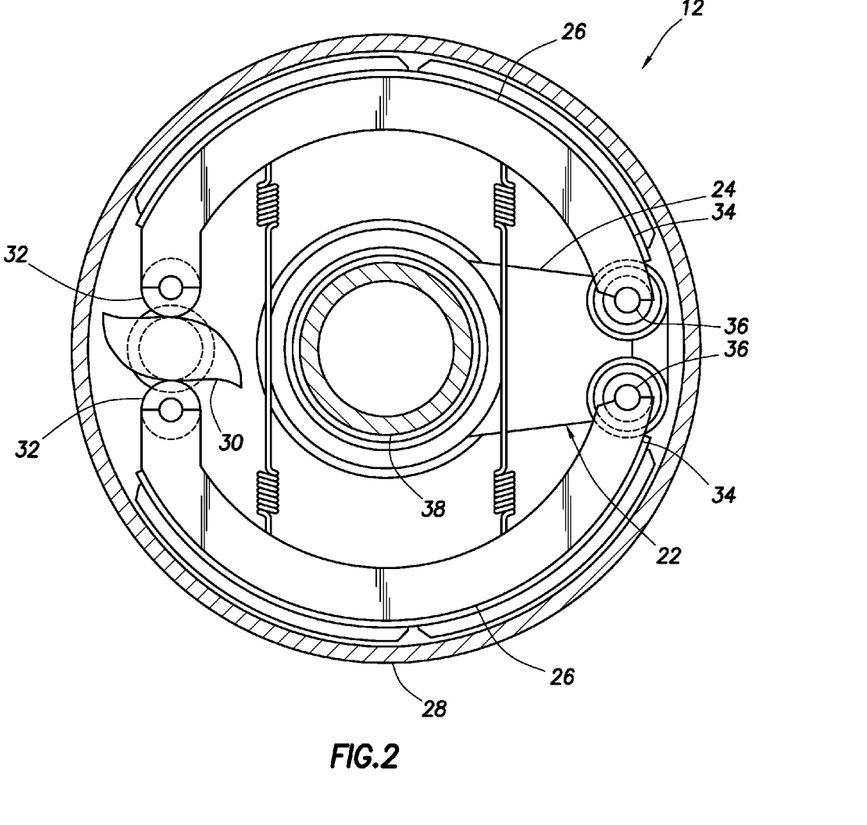
FIG. 2 is an enlarged scale partially cross-sectional view of drum brake components which may be used in the suspension systems of FIG. 1.

Referring additionally now to FIG. 2, an enlarged scale partially cross-sectional view of certain brake components of one of the suspension systems 12 are representatively illustrated. In the example depicted in FIG. 2, a brake mounting 22 comprises a brake spider 24 of the type used to pivotably mount brake shoes 26.

The brake shoes 26 are pivoted outwardly into contact with an inner surface of a brake drum 28 when an S-cam 30 is rotated between ends 32 of the brake shoes. Opposite ends 34 of the brake shoes 26 rotate about one or more pivots 36 (such as pins, etc.) retained in the brake spider 24.

In large part, the operation of the brakes in the example of FIG. 2 is conventional and will be well understood by those skilled in the art. However, this disclosure describes how the suspension system 12 (including brakes thereof) can be constructed in a convenient, and cost and weight reducing, manner.

Note that, in conventional practice, the brake spider 24 would be a separate component which is separately welded to an axle 38. However, in this disclosure, the inventors describe how the brake mounting 22 can be incorporated as part of a suspension arm (described more fully below), so that the suspension arm with the brake mounting can be attached together to the axle 38.

Although the brake mounting 22 is depicted in FIG. 2 as comprising the brake spider 24 for pivotably mounting the brake shoes 26, it should be clearly understood that other types of brake mountings may be used, without departing from the principles of this disclosure. For example, the brake mounting 22 could instead be of the type which is used to mount a disc brake caliper for biasing brake pads into contact with a brake disc.

Figure 3:
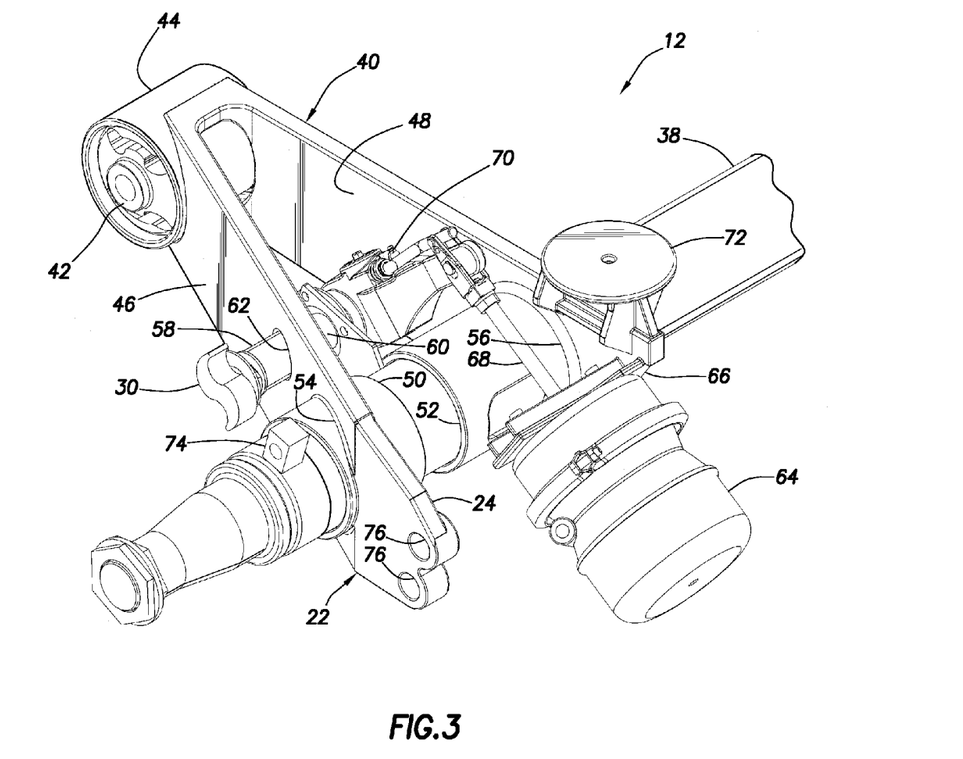
FIG. 3 is a perspective view of an example of a suspension system embodying principles of the present disclosure.

Referring additionally now to FIG. 3, a portion of the suspension system 12 at one end of the axle 38 is representatively illustrated. In this view it may be seen that the suspension system 12 includes a suspension arm 40 which is attached proximate the end of the axle 38.

In the example of FIG. 3, the suspension arm 40 has a pivot connection 44 at one end, and the suspension arm is attached to the axle 38 at an opposite end. The pivot connection 44 includes a resilient bushing 42 for pivotably mounting the suspension arm 40 relative to a vehicle frame (such as the frames 14, 16).

For example, the pivot connection 44 may be used to pivotably connect the suspension arm 40 to a hanger bracket (not shown) extending downwardly from the frame 14. Rotation of the suspension arm 40 about the pivot connection 44 allows the axle 38 to displace vertically up and down relative to the frame 14. Although the suspension arm 40 is depicted in the drawings as being of the "trailing arm" type, other types of suspension arms can incorporate the principles of this disclosure.

The suspension arm 40 of FIG. 3 includes two generally vertical side walls 46, 48. The side walls 46, 48 extend from the pivot connection 44 to the axle 38. In the example of FIG. 3, the side walls 46, 48 diverge from each other in the direction from the pivot connection 44 to the axle 38, but in other examples the side walls could be parallel to each other, one or both of the side walls could be inclined relative to the longitudinal direction, etc.

The side walls 46, 48 are preferably formed by casting, but they could in other examples be fabricated from plate material, or fabricated using other methods. Although the suspension arm 40 is depicted as including the two side walls 46, 48, in other examples the suspension arm could include additional or other walls (such as top and/or bottom walls), the suspension arm could have other shapes, etc., without departing from the principles of this disclosure.

The axle 38 extends through the side walls 46, 48. In the example of FIG. 3, sleeves 50, 52 are interposed between the side walls 46, 48 and the axle 38. Thus, the sleeves 50, 52 are preferably welded in openings 54, 56 formed through the side walls 46, 48, the suspension arm 40 is slid onto the end of the axle 38, and then the sleeves are welded to the axle.

In other examples, one or both of the side walls 46, 48 could be welded directly to the axle 38, if desired, without use of the sleeves 50, 52. In still other examples, the side walls 46, 48 and/or sleeves 50, 52 may not completely surround the axle 38, since the axle could instead be positioned in a slot or recess formed in the side walls and/or sleeves, in which case the side walls and/or sleeves may only partially or substantially surround the axle 38. Thus, the openings 54, 56, and the term "opening" itself, should be understood to include recesses, slots, etc. which receive components therein, without necessarily requiring that the openings completely surround the components.

A sleeve 58 is also provided for extending an S-cam shaft 60 through an opening 62 in the side wall 46. In this manner, the S-cam shaft 60 can extend laterally through the side wall 46, so that the S-cam 30 is appropriately aligned with the brake mounting 22.

The suspension system 12 as depicted in FIG. 3 also includes a brake actuator 64 attached via a bracket 66 to the suspension arm 40. The brake actuator 64 is used to rotate the S-cam shaft 60 (and the attached S-cam 30) via an actuator rod 68 and slack adjuster 70, in order to actuate the brakes.

The bracket 66 may be attached to the side wall 48 and/or the sleeve 52, with the brake actuator 64 being thereby positioned rearward and above the axle 38. The bracket 66 could alternatively, or in addition, be attached to any other component of the suspension system 12 (such as, directly to the axle 38).

The example of FIG. 3 also has an air spring mounting platform 72 attached to the side wall 48, such as by welding. Although welding is described herein as one preferred manner of attaching various components of the suspension system 12 to each other, it should be understood that other attachment means (such as, use of fasteners, bonding, integral manufacture, etc.) may be used in keeping with the principles of this disclosure.

It will be appreciated that the various components of the suspension system 12 described above (other than the axle 38) can be assembled as a unit, and then slid or fitted onto an end of the axle and secured to the axle in a single operation. For example, the suspension arm 40 with the pivot connection 44, bushing 42, sleeves 50, 52, 58, S-cam 30 and shaft 60, brake actuator 64, slack adjuster 70 and platform 72 can be assembled as a unit, the axle 38 can be slid through (or positioned into) the sleeves 50, 52, and the sleeves 50, 52 can then be welded to the axle. This manner of assembling the suspension system 12 can significantly reduce the time (and associated cost) required to manufacture the suspension system.

An antilock brake sensor mounting 74 is depicted in FIG. 3 as being separately attached to the axle 38, but it will be appreciated that the sensor mounting could be conveniently incorporated into another component of the suspension system 12, so that the sensor mounting is part of the unit described above which is slid or fitted onto the axle and attached thereto. For example, the sensor mounting 74 could be attached to the sleeve 50.

Figure 4A:
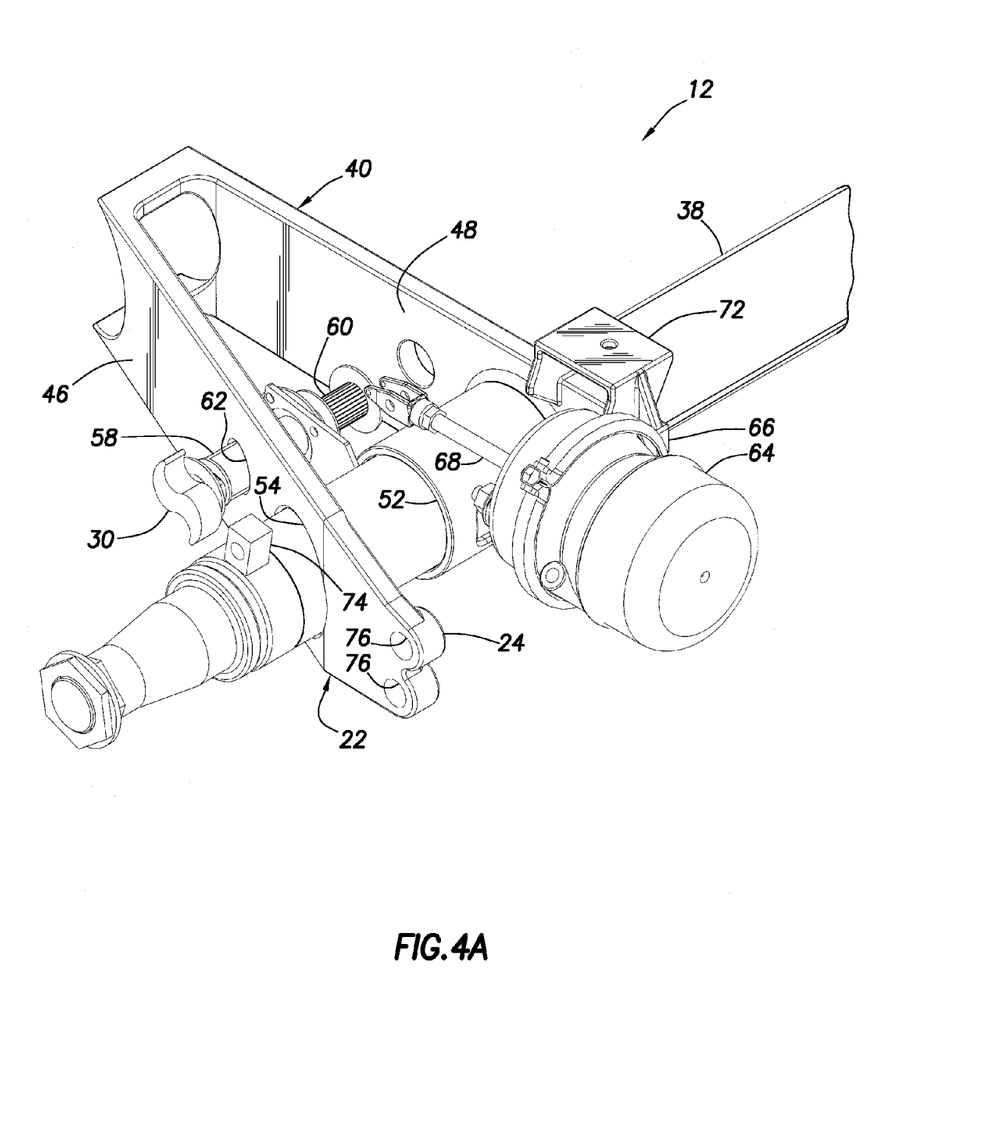
FIG. 4A is a perspective view of another configuration of the suspension system.

Referring additionally now to FIG. 4A, another configuration of the suspension system is representatively illustrated. The FIG. 4A configuration is similar in most respects to the FIG. 3 configuration. However, the pivot connection 44 and several other components of the suspension system 12 are not depicted in FIG. 4A, so that the relationships between the other components can be more clearly seen.

Note that the brake actuator 64 is positioned in a more upward orientation as compared to the FIG. 3 configuration. The FIG. 4A configuration has the brake actuator bracket 66 incorporated as part of the air spring platform 72 for attachment to the side arm 48.

In FIG. 4A, the manner in which the side arms 46, 48 are integrally formed with each other as a single casting can be more easily seen. However, it is not necessary for the side arms 46, 48 to be integrally formed, or for them to be cast, since any method of fabricating the suspension arm 40 may be used in keeping with the principles of this disclosure.

Note that the brake spider 24 includes one or more openings 76 for receiving one or more brake pivots (such as the pivots 36 described above) therein. Only one brake pivot 36 may be used in some examples.

Figure 4B:
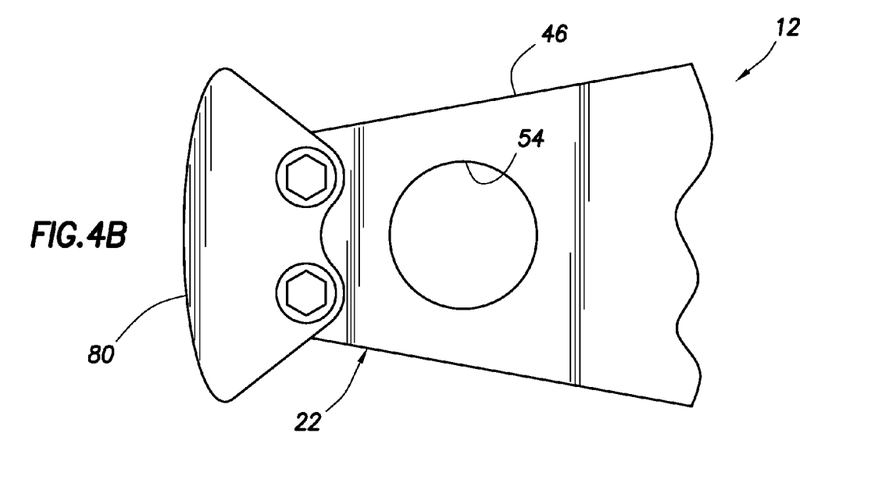
FIG. 4B is an inner side view of a side wall of a suspension arm of the suspension system, showing a disc brake caliper mounting.

Of course, if disc brakes are to be used, then the brake mounting 22 can include features for mounting a disc brake caliper 80 (see FIG. 4B), and the S-cam 30 and shaft 60, and the brake actuator 64 and associated components, would not be used. In that case, the openings 76 of the brake mounting 22, if suitably configured and arranged, could be used for mounting the disc brake caliper 80 (which may be hydraulically or pneumatically operated). Thus, the brake mounting 22 may be used for mounting drum brakes or disc brakes in keeping with the principles of this disclosure.

Figure 5:
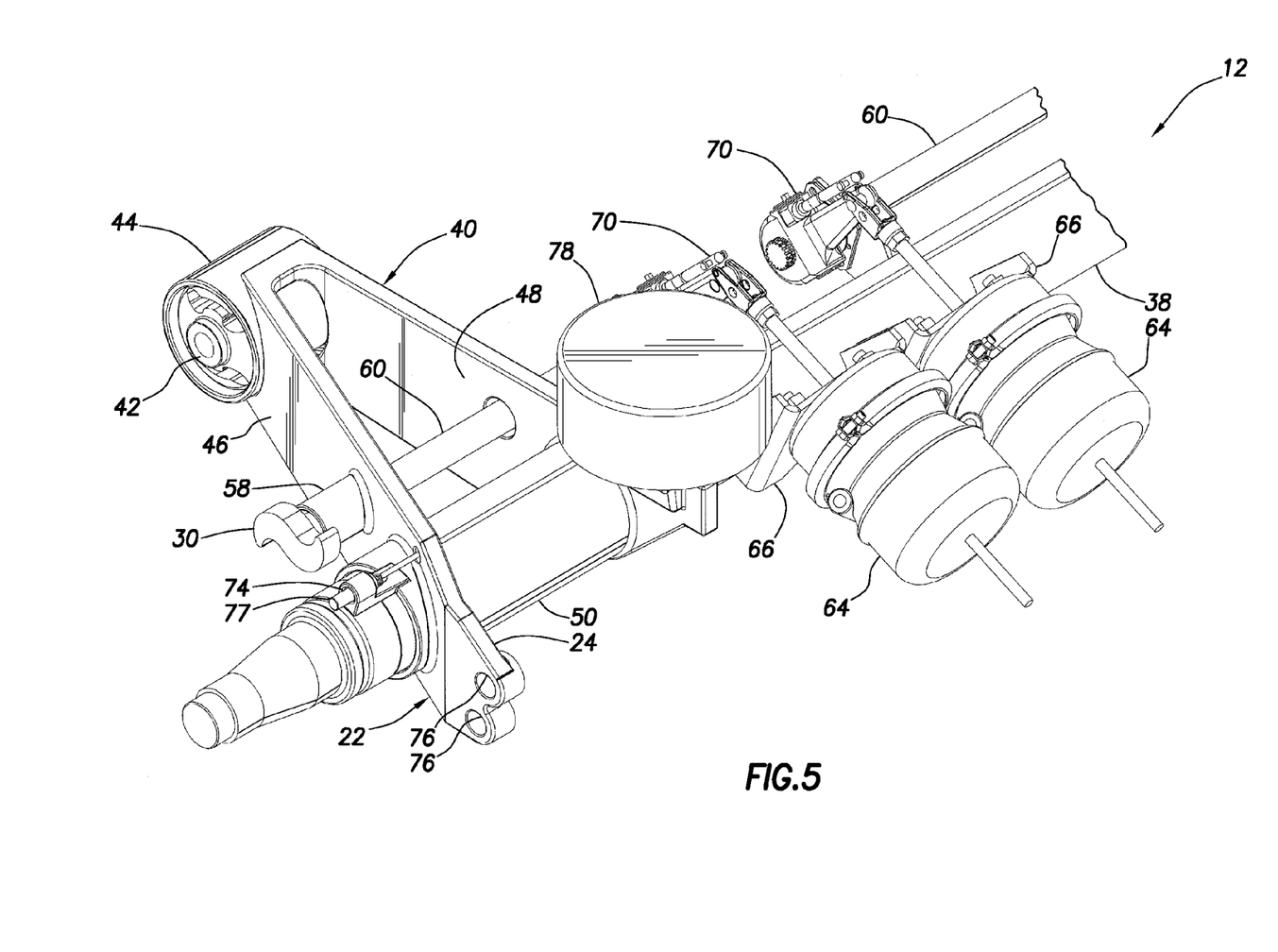
FIG. 5 is a perspective view of yet another configuration of the suspension system.

Referring additionally now to FIG. 5, another configuration of the suspension system 12 is representatively illustrated. In this configuration, a single sleeve 50 is used to attach the suspension arm 40 to the axle 38, but the sleeve extends through both of the side walls 46, 48.

The brake actuator 64 is attached to the axle 38 at a more central position, such that the brake actuator is not laterally between the side walls 46, 48. Thus, the S-cam shaft 60 extends through both of the side walls 46, 48.

The sensor mounting 74 is attached to the sleeve 50. An antilock brake sensor 77 is depicted as being secured to the sensor mounting 74. In addition, FIG. 5 shows an air spring piston 78 secured to the platform 72 (not visible in FIG. 5).

Figure 6:
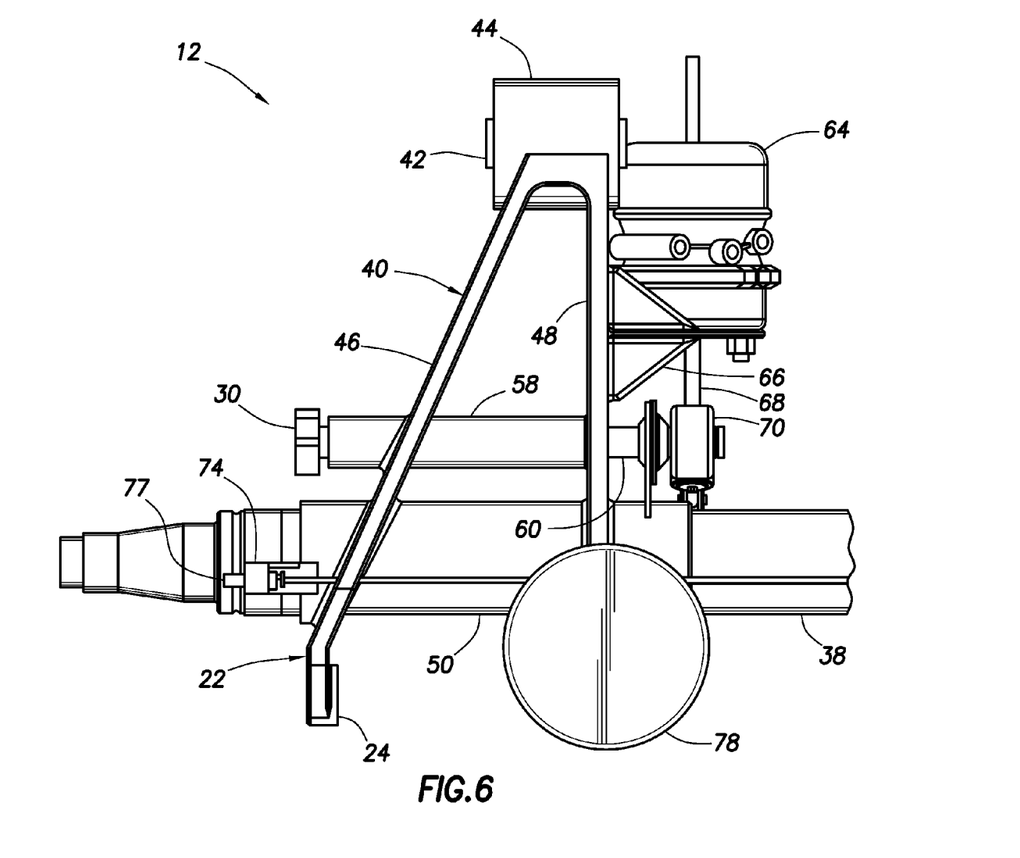
FIG. 6 is a perspective view of a further configuration of the suspension system.

Referring additionally now to FIG. 6, a top view of another configuration of the suspension system 12 is representatively illustrated. The configuration of FIG. 6 is similar in many respects to the configuration of FIG. 5, with the most apparent difference being the mounting of the brake actuator 64 forward of the axle 38. Note that the bracket 66 is attached to the side wall 48, instead of to the axle 38 as in the FIG. 5 configuration.

Another difference in the FIG. 6 configuration is that the sleeve 58 extends through the side wall 46 and to the side wall 48. The slack adjuster 70 is also positioned forward of the axle 38, on the same side of the axle as the brake actuator 64.

Figure 7:
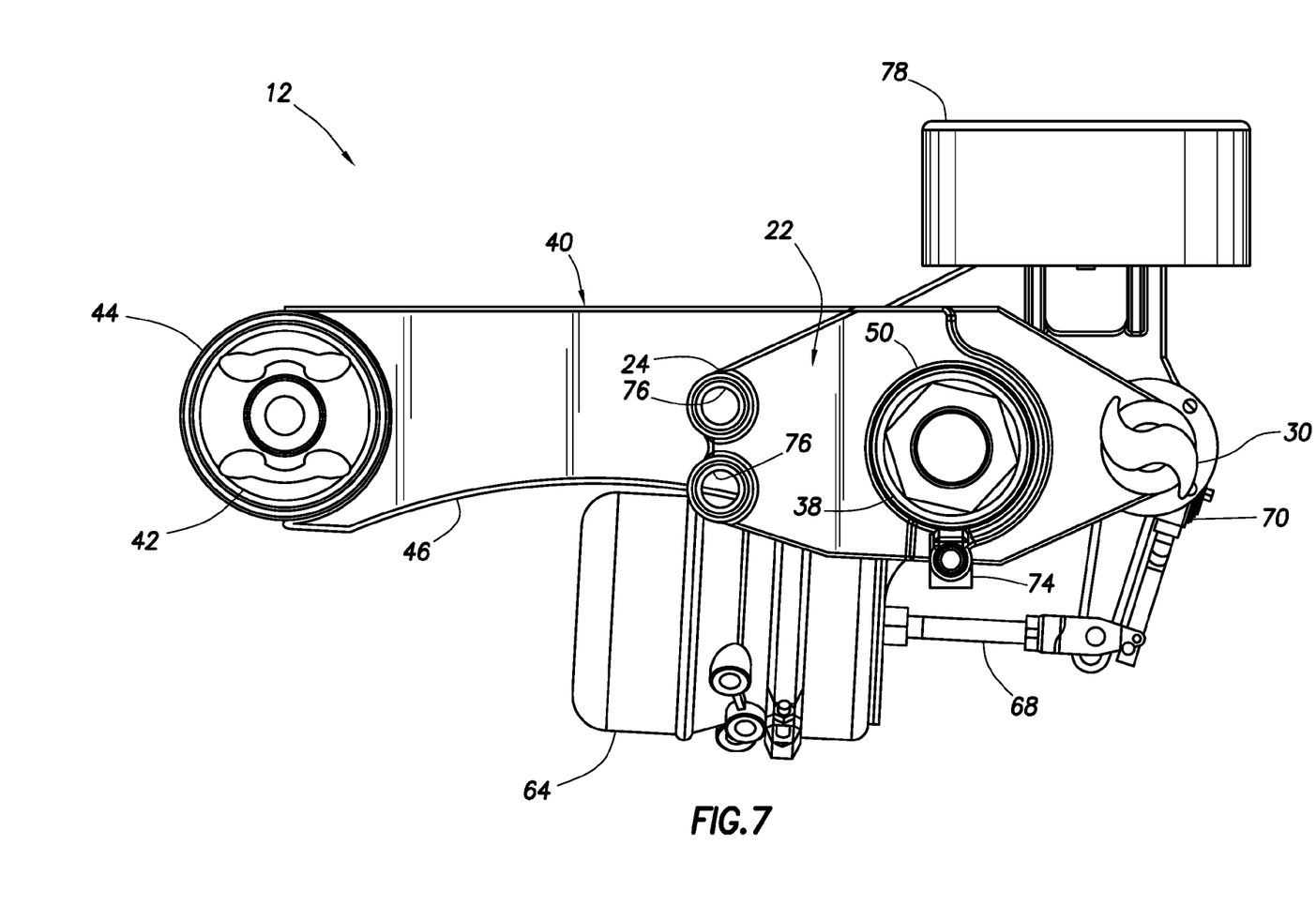
FIG. 7 is a perspective view of a still further configuration of the suspension system.

Referring additionally now to FIG. 7, a side view of another configuration of the suspension system 12 is representatively illustrated. In the FIG. 7 configuration, the orientation of the brake spider 24 is reversed as compared to the configuration of FIG. 6. In addition, the S-cam 30 is positioned rearward of the axle 38. Thus, it can be seen that many different configurations of suspension systems can be constructed using the principles of this disclosure.

It may now be fully appreciated that the above disclosure provides many advancements to the art of constructing suspension systems. The various examples of the suspension system 12 described above are relatively light in weight, reduce the number of components which must be produced, inventoried, assembled, etc., and reduce the time and cost required for manufacturing.

The above disclosure provides to the art a method of constructing a vehicle suspension system 12, with the method including the steps of: forming a suspension arm 40 having a pivot connection 44 at an end thereof, and a brake mounting 22 integrally formed with the suspension arm 40; and then securing the suspension arm 40 to an axle 38.

The step of forming the suspension arm 40 may include forming a generally vertical side wall 46 of the arm 40. The brake mounting 22 may be integrally formed with the side wall 46 as a single element.

The side wall 46 may extend from the pivot connection 44 to the brake mounting 22. An S-cam shaft 60 may extend through the side wall 46.

The step of securing the suspension arm 40 to the axle 38 may include inserting the axle 38 through an opening 54 extending through the side wall 46. The opening 54 may be positioned between another opening 62 which receives the S-cam shaft 60 therein and at least one other opening 76 of the brake mounting 22 which receives a brake shoe pivot 36 therein.

The brake mounting 22 may comprise a brake spider 24 having at least one opening 76 which receives a brake shoe pivot 36 therein.

Also provided by the above disclosure is a suspension system 12 which includes an axle 38 and a suspension arm 40 having a pivot connection 44 which pivotably connects the arm 40 to a vehicle frame (such as frames 14, 16), whereby the axle 38 is vertically displaceable relative to the frame. At least one brake shoe 26 is pivotably mounted to the suspension arm 40.

The suspension arm 40 may includes at least one opening 76 formed therein which receives a brake shoe pivot 36.

The axle 38 may extend laterally though a side wall 46, 48 of the suspension arm 40. The axle 38 may be positioned in the suspension arm 40 between the pivot connection 44 and the at least one opening 76 which receives a brake shoe pivot 36. The opening 76 which receives a brake shoe pivot 36 may be positioned in the suspension arm 40 between the pivot connection 44 and the axle 38.

The brake shoe 26 may be pivotably mounted to a side wall 46 of the suspension arm 40. An S-cam shaft 60 may extend through the side wall 46. The axle 38 may extend through the side wall 46, and the axle 38 may be positioned between the S-cam shaft 60 and the at least one opening 76 which receives the brake shoe pivot 36.

The side wall 46 may extend between the pivot connection 44 and the at least one opening 76 which receives the brake shoe pivot 36.

The above disclosure also describes a suspension system 12 which includes a suspension arm 40 having a pivot connection 44 at an end thereof, and a brake spider 24 integrally formed with the suspension arm 40. The brake spider 24 includes at least one opening 76 which receives a brake shoe pivot 36 therein.

The suspension arm 40 may include a generally vertical side wall 46. The brake spider 24 may be integrally formed with the side wall 46 as a single element.

The side wall 46 may extend from the pivot connection 44 to the brake spider 24. An S-cam shaft 60 may extend through the side wall 46. An axle 38 may extend through the side wall 46, with the axle 38 being positioned in the side wall 46 between the S-cam shaft 60 and the at least one opening 76 which receives the brake shoe pivot 36 therein.

Also described by the above disclosure is a method of constructing a vehicle suspension system 12, with the method including the steps of: forming a suspension arm 40 having a pivot connection 44 at an end thereof, and a brake mounting 22 integrally formed with the suspension arm 40; and then securing the suspension arm 40 to an axle 38.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of constructing a vehicle suspension system, the method comprising the steps of:
   forming a suspension arm having a pivot connection at an end thereof, and having a brake mounting integrally formed with the suspension arm; and
   then securing the suspension arm to an axle, whereby the axle pivots with the suspension arm about the pivot connection.

2. The method of claim 1, wherein the suspension arm forming step further comprises forming a generally vertical side wall of the arm, and wherein the brake mounting is integrally formed with the side wall.

3. The method of claim 2, wherein the side wall extends from the pivot connection to the brake mounting.

4. The method of claim 2, wherein an S-cam shaft extends through the side wall.

5. The method of claim 4, wherein the securing step further comprises inserting the axle through a first opening extending through the side wall, the first opening being positioned between a second opening which receives the S-cam shaft therein and at least one third opening of the brake mounting which receives a brake shoe pivot therein.

6. The method of claim 1, wherein the brake mounting comprises a brake spider having at least one opening which receives a brake shoe pivot therein.

7. The method of claim 1, further comprising the step of attaching a disc brake caliper to the brake mounting.

8. A suspension system, comprising:
   an axle; and
   a suspension arm having a pivot connection which pivotably connects the arm to a vehicle frame, whereby the axle is vertically displaceable relative to the frame, and wherein at least one brake shoe is pivotably mounted to the suspension arm.

9. The suspension system of claim 8, wherein the suspension arm includes at least one opening formed therein which receives a brake shoe pivot.

10. The suspension system of claim 9, wherein the axle extends laterally though a side wall of the suspension arm.

11. The suspension system of claim 10, wherein the axle is positioned in the suspension arm between the pivot connection and the at least one opening which receives a brake shoe pivot.

12. The suspension system of claim 10, wherein the at least one opening which receives a brake shoe pivot is positioned in the suspension arm between the pivot connection and the axle.

13. The suspension system of claim 8, wherein the at least one brake shoe is pivotably mounted to a side wall of the suspension arm.

14. The suspension system of claim 13, wherein an S-cam shaft extends through the side wall.

15. The suspension system of claim 14, wherein the axle extends through the side wall, and wherein the axle is positioned between the S-cam shaft and the at least one opening which receives the brake shoe pivot.

16. The suspension system of claim 13, wherein the side wall extends between the pivot connection and the at least one opening which receives the brake shoe pivot.

17. A suspension system, comprising:
   a suspension arm having a pivot connection at an end thereof, and having a brake mounting integrally formed with the suspension arm, whereby an axle pivots with the suspension arm about the pivot connection; and
   wherein at least one of a brake shoe and a disc brake caliper is attached to the brake mounting.

18. The suspension system of claim 17, wherein the suspension arm includes a generally vertical side wall, and wherein the brake mounting is integrally formed with the side wall.

19. The suspension system of claim 18, wherein the side wall extends from the pivot connection to the brake mounting.

20. The suspension system of claim 18, wherein an S-cam shaft extends through the side wall.

21. The suspension system of claim 20, wherein an axle extends through the side wall, the axle being positioned in the side wall between the S-cam shaft and the brake mounting, the brake mounting including at least one opening which receives a brake shoe pivot therein.

22. A method of constructing a vehicle suspension system, the method comprising the steps of:
   forming a suspension arm having a pivot connection at an end thereof, and a brake mounting integrally formed with the suspension arm; and
   then securing the suspension arm to an axle, the pivot connection pivotably connecting the arm to a vehicle frame.

23. The method of claim 22, wherein the suspension arm forming step further comprises forming a generally vertical side wall of the arm, and wherein the brake mounting is integrally formed with the side wall.

24. The method of claim 23, wherein the side wall extends from the pivot connection to the brake mounting.

25. The method of claim 23, wherein an S-cam shaft extends through the side wall.

26. The method of claim 25, wherein the securing step further comprises inserting the axle through a first opening extending through the side wall, the first opening being positioned between a second opening which receives the S-cam shaft therein and at least one third opening of the brake mounting which receives a brake shoe pivot therein.

27. The method of claim 22, wherein the brake mounting includes at least one opening which receives a brake shoe pivot.

28. The method of claim 22, further comprising the step of attaching a disc brake caliper to the brake mounting.

* * * * *